(12) United States Patent
Nelken et al.

(10) Patent No.: US 7,756,810 B2
(45) Date of Patent: Jul. 13, 2010

(54) SOFTWARE TOOL FOR TRAINING AND TESTING A KNOWLEDGE BASE

(75) Inventors: Yoram Nelken, San Franscisco, CA (US); Ronen Hod, Jerusalem (IL); Amir Navot, Jerusalem (IL); Sam Michelson, Jerusalem (IL); Randy Jessee, San Francisco, CA (US); Tsachy Shacham, Jerusalem (IL); Beth Lanin, Jerusalem (IL); Nissan Hajaj, Foster City, CA (US); Avi Margalit, Jerusalem (IL); Josemina Magdalen, Jerusalem (IL); Dani Cohen, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 11/843,937

(22) Filed: Aug. 23, 2007

(65) Prior Publication Data
US 2007/0294201 A1  Dec. 20, 2007

Related U.S. Application Data

(63) Continuation of application No. 10/835,694, filed on Apr. 29, 2004.

(60) Provisional application No. 60/468,493, filed on May 6, 2003.

(51) Int. Cl.
*G06F 17/00* (2006.01)
*G06N 5/04* (2006.01)

(52) U.S. Cl. .................................................... 706/60
(58) Field of Classification Search .................. 706/60, 706/61, 18
See application file for complete search history.

(56) References Cited

U.S. PATENT DOCUMENTS

| | | | |
|---|---|---|---|
| 3,648,253 | A | 3/1972 | Mullery et al. |
| 4,110,823 | A | 8/1978 | Cronshaw et al. |
| 4,286,322 | A | 8/1981 | Hoffman et al. |
| 4,586,160 | A | 4/1986 | Amano et al. |
| 4,589,081 | A | 5/1986 | Massa et al. |

(Continued)

FOREIGN PATENT DOCUMENTS

CA  2180392  2/2001

(Continued)

OTHER PUBLICATIONS

'Brainmaker Professional': California Scientific Software, 1993.*

(Continued)

*Primary Examiner*—Donald Sparks
*Assistant Examiner*—Peter Coughlan
(74) *Attorney, Agent, or Firm*—Gates & Cooper LLP

(57) ABSTRACT

A software tool for creating, training and testing a knowledge base of a computerized customer relationship management system is disclosed. The software tool includes corpus editing processes for displaying and editing text-based corpus items, and assigning selected categories to individual corpus items. Knowledge base construction processes construct a knowledge base by analyzing a first subset of the corpus items, and testing processes test the knowledge base on a second subset of the corpus items. Reporting processes generate reports containing indicia representative of the testing results, which may be utilized to edit the corpus items and retrain the knowledge base so as to improve performance.

16 Claims, 7 Drawing Sheets

U.S. PATENT DOCUMENTS

| | | |
|---|---|---|
| 4,642,756 A | 2/1987 | Sherrod |
| 4,658,370 A | 4/1987 | Erman et al. |
| 4,724,523 A | 2/1988 | Kucera |
| 4,805,107 A | 2/1989 | Kieckhafer et al. |
| 4,814,974 A | 3/1989 | Narayanan et al. |
| 4,817,027 A | 3/1989 | Plum et al. |
| 4,908,865 A | 3/1990 | Doddington et al. |
| 4,918,735 A | 4/1990 | Morito et al. |
| 4,942,527 A | 7/1990 | Schumacher |
| 4,984,178 A | 1/1991 | Hemphill et al. |
| 5,018,215 A | 5/1991 | Nasr et al. |
| 5,023,832 A | 6/1991 | Fulcher et al. |
| 5,040,141 A | 8/1991 | Yazima et al. |
| 5,051,924 A | 9/1991 | Bergeron et al. |
| 5,060,155 A | 10/1991 | van Zuijlen |
| 5,067,099 A | 11/1991 | McCown et al. |
| 5,068,789 A | 11/1991 | van Vliembergen |
| 5,099,425 A | 3/1992 | Kanno et al. |
| 5,101,349 A | 3/1992 | Tokuume et al. |
| 5,111,398 A | 5/1992 | Nunberg et al. |
| 5,118,105 A | 6/1992 | Brim et al. |
| 5,125,024 A | 6/1992 | Gokcen et al. |
| 5,148,408 A | 9/1992 | Matthews |
| 5,210,872 A | 5/1993 | Ferguson et al. |
| 5,228,116 A | 7/1993 | Harris et al. |
| 5,230,054 A | 7/1993 | Tamura |
| 5,247,677 A | 9/1993 | Welland et al. |
| 5,251,129 A | 10/1993 | Jacobs |
| 5,251,131 A | 10/1993 | Masand et al. |
| 5,265,033 A | 11/1993 | Vajk et al. |
| 5,278,942 A | 1/1994 | Bahl et al. |
| 5,287,430 A | 2/1994 | Iwamoto et al. |
| 5,311,583 A | 5/1994 | Friedes et al. |
| 5,321,608 A | 6/1994 | Namba et al. |
| 5,325,298 A | 6/1994 | Gallant |
| 5,325,526 A | 6/1994 | Cameron et al. |
| 5,345,501 A | 9/1994 | Shelton |
| 5,349,526 A | 9/1994 | Potts et al. |
| 5,365,430 A | 11/1994 | Jagadish |
| 5,369,570 A | 11/1994 | Parad |
| 5,369,577 A | 11/1994 | Kadashevich et al. |
| 5,371,807 A | 12/1994 | Register et al. |
| 5,377,354 A | 12/1994 | Scannell et al. |
| 5,418,717 A | 5/1995 | Su et al. |
| 5,418,948 A | 5/1995 | Turtle |
| 5,437,032 A | 7/1995 | Wolf et al. |
| 5,444,820 A | 8/1995 | Tzes et al. |
| 5,475,588 A | 12/1995 | Schabes et al. |
| 5,483,466 A | 1/1996 | Kawahara et al. |
| 5,487,100 A | 1/1996 | Kane |
| 5,493,677 A | 2/1996 | Balogh et al. |
| 5,493,692 A | 2/1996 | Theimer et al. |
| 5,522,026 A | 5/1996 | Records et al. |
| 5,526,521 A | 6/1996 | Fitch et al. |
| 5,542,088 A | 7/1996 | Jennings, Jr. et al. |
| 5,555,344 A | 9/1996 | Zunkler |
| 5,559,710 A | 9/1996 | Shahraray et al. |
| 5,574,933 A | 11/1996 | Horst |
| 5,577,241 A | 11/1996 | Spencer |
| 5,590,055 A | 12/1996 | Chapman et al. |
| 5,594,641 A | 1/1997 | Kaplan et al. |
| 5,596,502 A | 1/1997 | Koski et al. |
| 5,610,812 A | 3/1997 | Scabes et al. |
| 5,615,360 A | 3/1997 | Bezek et al. |
| 5,627,914 A | 5/1997 | Pagallo |
| 5,630,128 A | 5/1997 | Farrell et al. |
| 5,634,053 A | 5/1997 | Noble et al. |
| 5,634,121 A | 5/1997 | Tracz et al. |
| 5,636,124 A | 6/1997 | Rischar et al. |
| 5,649,215 A | 7/1997 | Itoh |
| 5,664,061 A | 9/1997 | Andreshak et al. |
| 5,680,628 A | 10/1997 | Carus |
| 5,687,384 A | 11/1997 | Nagase |
| 5,694,616 A | 12/1997 | Johnson et al. |
| 5,701,400 A | 12/1997 | Amado |
| 5,706,399 A | 1/1998 | Bareis |
| 5,708,829 A | 1/1998 | Kadashevich |
| 5,715,371 A | 2/1998 | Ahamed et al. |
| 5,721,770 A | 2/1998 | Kohler |
| 5,721,897 A | 2/1998 | Rubinstein |
| 5,724,481 A | 3/1998 | Garberg et al. |
| 5,737,621 A | 4/1998 | Kaplan et al. |
| 5,737,734 A | 4/1998 | Schultz |
| 5,745,652 A | 4/1998 | Bigus |
| 5,745,736 A | 4/1998 | Picart |
| 5,748,973 A | 5/1998 | Palmer et al. |
| 5,754,671 A | 5/1998 | Higgins et al. |
| 5,761,631 A | 6/1998 | Nasukawa |
| 5,765,033 A | 6/1998 | Miloslavsky |
| 5,768,578 A | 6/1998 | Kirk et al. |
| 5,794,194 A | 8/1998 | Takebayashi et al. |
| 5,799,268 A | 8/1998 | Boguraev |
| 5,809,462 A | 9/1998 | Nussbaum |
| 5,809,464 A | 9/1998 | Kopp et al. |
| 5,822,731 A | 10/1998 | Schultz |
| 5,822,745 A | 10/1998 | Hekmatpour |
| 5,826,076 A | 10/1998 | Bradley et al. |
| 5,832,220 A | 11/1998 | Johnson et al. |
| 5,835,682 A | 11/1998 | Broomhead et al. |
| 5,845,246 A | 12/1998 | Schalk |
| 5,850,219 A | 12/1998 | Kumomura |
| 5,860,059 A | 1/1999 | Aust et al. |
| 5,864,848 A | 1/1999 | Horvitz et al. |
| 5,864,863 A | 1/1999 | Burrows |
| 5,867,495 A | 2/1999 | Elliott et al. |
| 5,878,385 A | 3/1999 | Bralich et al. |
| 5,878,386 A | 3/1999 | Coughlin |
| 5,884,032 A | 3/1999 | Bateman et al. |
| 5,884,302 A | 3/1999 | Ho |
| 5,890,142 A | 3/1999 | Tanimura et al. |
| 5,890,147 A | 3/1999 | Peltonen et al. |
| 5,895,447 A | 4/1999 | Ittycheriah et al. |
| 5,899,971 A | 5/1999 | De Vos |
| 5,913,215 A | 6/1999 | Rubinstein et al. |
| 5,920,835 A | 7/1999 | Huzenlaub et al. |
| 5,933,822 A | 8/1999 | Braden-Harder et al. |
| 5,940,612 A | 8/1999 | Brady et al. |
| 5,940,821 A | 8/1999 | Wical |
| 5,944,778 A | 8/1999 | Takeuchi et al. |
| 5,946,388 A | 8/1999 | Walker et al. |
| 5,948,058 A | 9/1999 | Kudoh et al. |
| 5,950,184 A | 9/1999 | Kartutunen |
| 5,950,192 A | 9/1999 | Moore et al. |
| 5,956,711 A | 9/1999 | Sullivan et al. |
| 5,960,393 A | 9/1999 | Cohrs et al. |
| 5,963,447 A | 10/1999 | Kohn et al. |
| 5,963,894 A | 10/1999 | Richardson et al. |
| 5,970,449 A | 10/1999 | Alleva et al. |
| 5,974,385 A | 10/1999 | Ponting et al. |
| 5,974,465 A | 10/1999 | Wong |
| 5,983,216 A | 11/1999 | Kirach |
| 5,991,713 A | 11/1999 | Unger et al. |
| 5,991,751 A | 11/1999 | Rivette et al. |
| 5,991,756 A | 11/1999 | Wu |
| 5,995,513 A | 11/1999 | Harrand et al. |
| 5,999,932 A | 12/1999 | Paul |
| 5,999,990 A | 12/1999 | Sharrit et al. |
| 6,006,221 A | 12/1999 | Liddy et al. |
| 6,009,422 A | 12/1999 | Ciccarelli |
| 6,012,053 A | 1/2000 | Pant et al. |
| 6,018,735 A | 1/2000 | Hunter |
| 6,021,403 A | 2/2000 | Horvitz et al. |
| 6,025,843 A | 2/2000 | Sklar |
| 6,026,388 A | 2/2000 | Liddy et al. |

| | | | | | | | |
|---|---|---|---|---|---|---|---|
| 6,032,111 | A | 2/2000 | Mohri et al. | 6,314,439 | B1 | 11/2001 | Bates et al. |
| 6,035,104 | A | 3/2000 | Zahariev | 6,314,446 | B1 | 11/2001 | Stiles |
| 6,038,535 | A | 3/2000 | Campbell | 6,324,534 | B1 | 11/2001 | Neal et al. |
| 6,038,560 | A | 3/2000 | Wical | 6,327,581 | B1 | 12/2001 | Platt |
| 6,055,528 | A | 4/2000 | Evans | 6,349,295 | B1 | 2/2002 | Tedesco et al. |
| 6,058,365 | A | 5/2000 | Nagai et al. | 6,353,667 | B1 | 3/2002 | Foster et al. |
| 6,058,389 | A | 5/2000 | Chandra et al. | 6,353,827 | B1 | 3/2002 | Davies et al. |
| 6,061,667 | A | 5/2000 | Danford-Klein et al. | 6,360,243 | B1 | 3/2002 | Lindsley et al. |
| 6,061,709 | A | 5/2000 | Bronte | 6,363,373 | B1 | 3/2002 | Steinkraus |
| 6,064,953 | A | 5/2000 | Maxwell, III et al. | 6,363,377 | B1 | 3/2002 | Kravets et al. |
| 6,064,971 | A | 5/2000 | Hartnett | 6,366,910 | B1 | 4/2002 | Rajaraman et al. |
| 6,064,977 | A | 5/2000 | Haverstock et al. | 6,370,526 | B1 | 4/2002 | Agrawal et al. |
| 6,067,565 | A | 5/2000 | Horvitz | 6,374,221 | B1 | 4/2002 | Haimi-Cohen |
| 6,070,149 | A | 5/2000 | Tavor et al. | 6,377,945 | B1 | 4/2002 | Rievik |
| 6,070,158 | A | 5/2000 | Kirsch et al. | 6,377,949 | B1 | 4/2002 | Gilmour |
| 6,073,098 | A | 6/2000 | Buchsbaum et al. | 6,393,415 | B1 | 5/2002 | Getchius et al. |
| 6,073,101 | A | 6/2000 | Maes | 6,397,209 | B1 | 5/2002 | Read et al. |
| 6,076,088 | A | 6/2000 | Paik et al. | 6,397,212 | B1 | 5/2002 | Biffar |
| 6,081,774 | A | 6/2000 | de Hita et al. | 6,401,084 | B1 | 6/2002 | Ortega et al. |
| 6,085,159 | A | 7/2000 | Ortega et al. | 6,408,277 | B1 | 6/2002 | Nelken |
| 6,092,042 | A | 7/2000 | Iso | 6,411,947 | B1 | 6/2002 | Rice et al. |
| 6,092,095 | A | 7/2000 | Maytal | 6,411,982 | B2 | 6/2002 | Williams |
| 6,094,652 | A | 7/2000 | Falsal | 6,415,250 | B1 | 7/2002 | van den Akker |
| 6,098,047 | A | 8/2000 | Oku et al. | 6,418,458 | B1 | 7/2002 | Maresco |
| 6,101,537 | A | 8/2000 | Edelstein et al. | 6,421,066 | B1 | 7/2002 | Sivan |
| 6,112,126 | A | 8/2000 | Hales et al. | 6,421,675 | B1 | 7/2002 | Ryan et al. |
| 6,115,734 | A | 9/2000 | Mansion | 6,424,995 | B1 | 7/2002 | Shuman |
| 6,138,128 | A | 10/2000 | Perkowitz et al. | 6,424,997 | B1 | 7/2002 | Buskirk, Jr. et al. |
| 6,138,139 | A | 10/2000 | Beck et al. | 6,430,615 | B1 | 8/2002 | Hellerstein et al. |
| 6,144,940 | A | 11/2000 | Nishi et al. | 6,434,435 | B1 | 8/2002 | Tubel et al. |
| 6,148,322 | A | 11/2000 | Sand et al. | 6,434,554 | B1 | 8/2002 | Asami et al. |
| 6,151,538 | A | 11/2000 | Bate et al. | 6,434,556 | B1 | 8/2002 | Levin et al. |
| 6,154,720 | A | 11/2000 | Onishi et al. | 6,438,540 | B2 | 8/2002 | Nasr et al. |
| 6,161,094 | A | 12/2000 | Adcock et al. | 6,442,542 | B1 | 8/2002 | Ramani et al. |
| 6,161,130 | A | 12/2000 | Horvitz et al. | 6,442,589 | B1 | 8/2002 | Takahashi et al. |
| 6,167,370 | A | 12/2000 | Tsourikov et al. | 6,446,061 | B1 | 9/2002 | Doerre et al. |
| 6,169,986 | B1 | 1/2001 | Bowman et al. | 6,446,081 | B1 | 9/2002 | Preston |
| 6,182,029 | B1 | 1/2001 | Friedman | 6,446,256 | B1 | 9/2002 | Hyman et al. |
| 6,182,036 | B1 | 1/2001 | Poppert | 6,449,589 | B1 | 9/2002 | Moore |
| 6,182,059 | B1 | 1/2001 | Angotti et al. | 6,449,646 | B1 | 9/2002 | Sikora et al. |
| 6,182,063 | B1 | 1/2001 | Woods | 6,460,074 | B1 | 10/2002 | Fishkin |
| 6,182,065 | B1 | 1/2001 | Yeomans | 6,463,533 | B1 | 10/2002 | Calamera et al. |
| 6,182,120 | B1 | 1/2001 | Beaulieu et al. | 6,466,940 | B1 | 10/2002 | Mills |
| 6,185,603 | B1 | 2/2001 | Henderson et al. | 6,477,500 | B1 | 11/2002 | Maes |
| 6,199,103 | B1 | 3/2001 | Sakaguchi et al. | 6,477,580 | B1 | 11/2002 | Bowman-Amuah |
| 6,203,495 | B1 | 3/2001 | Bardy | 6,480,843 | B2 | 11/2002 | Li |
| 6,212,544 | B1 | 4/2001 | Borkenhagen et al. | 6,490,572 | B2 | 12/2002 | Akkiraju et al. |
| 6,223,201 | B1 | 4/2001 | Reznak | 6,493,447 | B1 | 12/2002 | Goss et al. |
| 6,226,630 | B1 | 5/2001 | Billmers | 6,493,694 | B1 | 12/2002 | Xu et al. |
| 6,233,575 | B1 | 5/2001 | Agrawal et al. | 6,496,836 | B1 | 12/2002 | Ronchi |
| 6,233,578 | B1 | 5/2001 | Machihara et al. | 6,496,853 | B1 | 12/2002 | Klein |
| 6,236,987 | B1 | 5/2001 | Horowitz et al. | 6,505,158 | B1 | 1/2003 | Conkie |
| 6,243,679 | B1 | 6/2001 | Mohri et al. | 6,507,872 | B1 | 1/2003 | Geshwind |
| 6,243,735 | B1 | 6/2001 | Imanishi et al. | 6,513,026 | B1 | 1/2003 | Horvitz et al. |
| 6,249,606 | B1 | 6/2001 | Kiraly et al. | 6,535,795 | B1 | 3/2003 | Schroeder et al. |
| 6,253,188 | B1 | 6/2001 | Witek et al. | 6,542,889 | B1 | 4/2003 | Aggarwal et al. |
| 6,256,631 | B1 | 7/2001 | Malcolm | 6,560,330 | B2 | 5/2003 | Gabriel |
| 6,256,773 | B1 | 7/2001 | Bowman-Amuah | 6,560,590 | B1 | 5/2003 | Shwe et al. |
| 6,260,058 | B1 | 7/2001 | Hoenninger et al. | 6,571,282 | B1 | 5/2003 | Bowman-Amuah |
| 6,263,335 | B1 | 7/2001 | Paik et al. | 6,584,464 | B1 | 6/2003 | Warthen |
| 6,269,368 | B1 | 7/2001 | Diamond | 6,594,697 | B1 | 7/2003 | Praitis et al. |
| 6,271,840 | B1 | 8/2001 | Finseth et al. | 6,601,026 | B2 | 7/2003 | Appelt et al. |
| 6,275,819 | B1 | 8/2001 | Carter | 6,611,535 | B2 | 8/2003 | Ljungqvist |
| 6,278,973 | B1 | 8/2001 | Chung et al. | 6,611,825 | B1 | 8/2003 | Billheimer et al. |
| 6,282,565 | B1 | 8/2001 | Shaw et al. | 6,615,172 | B1 | 9/2003 | Bennett et al. |
| 6,292,794 | B1 | 9/2001 | Cecchini et al. | 6,618,727 | B1 | 9/2003 | Wheeler et al. |
| 6,292,938 | B1 | 9/2001 | Sarkar et al. | 6,651,220 | B1 | 11/2003 | Penteroudakis et al. |
| 6,298,324 | B1 | 10/2001 | Zuberec et al. | 6,654,726 | B1 | 11/2003 | Hanzek |
| 6,301,602 | B1 | 10/2001 | Ueki | 6,654,815 | B1 | 11/2003 | Goss et al. |
| 6,304,864 | B1 | 10/2001 | Liddy et al. | 6,665,662 | B1 | 12/2003 | Kirkwood et al. |
| 6,304,872 | B1 | 10/2001 | Chao | 6,675,159 | B1 | 1/2004 | Lin et al. |
| 6,308,197 | B1 | 10/2001 | Mason et al. | 6,704,728 | B1 | 3/2004 | Chang et al. |
| 6,311,194 | B1 | 10/2001 | Sheth et al. | 6,711,561 | B1 | 3/2004 | Chang et al. |

| | | | |
|---|---|---|---|
| 6,714,643 | B1 | 3/2004 | Gargeya et al. |
| 6,714,905 | B1 | 3/2004 | Chang et al. |
| 6,738,759 | B1 | 5/2004 | Wheeler et al. |
| 6,742,015 | B1 | 5/2004 | Bowman-Amuah |
| 6,744,878 | B1 | 6/2004 | Komissarchik et al. |
| 6,745,181 | B1 | 6/2004 | Chang et al. |
| 6,747,970 | B1 | 6/2004 | Lamb et al. |
| 6,748,387 | B2 | 6/2004 | Garber et al. |
| 6,766,320 | B1 | 7/2004 | Wang et al. |
| 6,785,671 | B1 | 8/2004 | Bailey et al. |
| 6,850,513 | B1 | 2/2005 | Pelissier |
| 6,862,710 | B1 | 3/2005 | Marchisio |
| 6,868,065 | B1 | 3/2005 | Kloth et al. |
| 6,879,586 | B2 | 4/2005 | Miloslavsky et al. |
| 6,915,344 | B1 | 7/2005 | Rowe et al. |
| 7,047,242 | B1 | 5/2006 | Ponte |
| 2001/0022558 | A1 | 9/2001 | Karr et al. |
| 2001/0027408 | A1* | 10/2001 | Nakisa ................. 705/10 |
| 2001/0027463 | A1 | 10/2001 | Kobayashi |
| 2001/0042090 | A1 | 11/2001 | Williams |
| 2001/0047270 | A1 | 11/2001 | Gusick et al. |
| 2001/0056456 | A1 | 12/2001 | Cota-Robles |
| 2002/0032715 | A1 | 3/2002 | Utsumi |
| 2002/0052907 | A1 | 5/2002 | Wakai et al. |
| 2002/0059161 | A1 | 5/2002 | Li |
| 2002/0059204 | A1* | 5/2002 | Harris ................. 707/3 |
| 2002/0065953 | A1 | 5/2002 | Alford et al. |
| 2002/0073129 | A1 | 6/2002 | Wang et al. |
| 2002/0078119 | A1 | 6/2002 | Brenner et al. |
| 2002/0078121 | A1 | 6/2002 | Ballantyne |
| 2002/0078257 | A1 | 6/2002 | Nishimura |
| 2002/0083251 | A1 | 6/2002 | Chauvel et al. |
| 2002/0087618 | A1 | 7/2002 | Bohm et al. |
| 2002/0087623 | A1 | 7/2002 | Eatough |
| 2002/0091746 | A1 | 7/2002 | Umberger et al. |
| 2002/0099714 | A1 | 7/2002 | Murray |
| 2002/0103871 | A1 | 8/2002 | Pustejovsky |
| 2002/0107926 | A1 | 8/2002 | Lee |
| 2002/0116463 | A1 | 8/2002 | Hart |
| 2002/0150966 | A1 | 10/2002 | Muraca |
| 2002/0154645 | A1 | 10/2002 | Hu et al. |
| 2002/0196911 | A1 | 12/2002 | Gao et al. |
| 2003/0028564 | A1 | 2/2003 | Sanfilippo |
| 2003/0046297 | A1 | 3/2003 | Mason |
| 2003/0069780 | A1* | 4/2003 | Hailwood et al. ......... 705/10 |
| 2004/0167889 | A1 | 8/2004 | Chang et al. |
| 2004/0254904 | A1 | 12/2004 | Nelken et al. |
| 2005/0187913 | A1 | 8/2005 | Nelken et al. |

FOREIGN PATENT DOCUMENTS

| | | |
|---|---|---|
| EP | 0 597 630 | 5/1994 |
| EP | 0 304 191 | 2/1999 |
| JP | 09106296 | 4/1997 |
| WO | WO 00/36487 | 6/2000 |
| WO | 01/84373 | 8/2001 |
| WO | 01/84374 | 8/2001 |

OTHER PUBLICATIONS

'Inductive learning algorithms and representations for text categorization': Dumais, ACM, 1998.*
'Brainmaker Profreesional' California Scientific Software, 1993.*
Breese et al, "Empirical Analysis of Predictive Algorithms for Collaborative Filtering," Proc. of the 14th Conf. on Uncertainty in Artificial Intelligence, Jul. 1998.
Czerwinski at al, "Visualizing Implicit Queries for Information Management and Retrieval," Proc. of CHI 1999; ACM SIGCHI Conf. on Human Factors in Computing Systems, 1999.
Dumais et al., "Inductive Learning Algorithms and Representations for Task Categorization," Proc. of 7th Intl. Conf. on Information & Knowledge Management, 1998.
Horvitz, "Principles of Mixed-Initiative User Interfaces," Proc. of CHI 1999; ACM SIGCHI Conf. on Human Factors in Computing Systems, 1999.
Horvitz et al, "Display of Information for Time-Critical Decision Making," Proc. of the 11th Conf. on Uncertainty in Artificial Intelligence, Jul. 1995.
Horvitz et al., "The Lumiere Project: Bayesian User Modeling . . . ," Proc. of the 14th Conf. on Uncertainty in Artificial Intelligence, Jul. 1998.
Horvitz et al., "Time-Dependent Utility and Action Under Uncertainty," Proc. of the 7th Conf. on Uncertainty in Artificial Intelligence, Jul. 1991.
Horvitz et al., "Time-Critical Action: Representations and Application," Proc. of the 13th Conf. on Uncertainty in Artificial Intelligence, Jul. 1997.
Koller et al., "Toward Optimal Feature Selection," Proc. of 13th Conf. on Machine Learning, 1996.
Lieberman, "Letizia: An Agent That Assists in Web Browsing," Proc. of International Joint Conference on Artificial Intelligence, 1995.
Platt, "Fast Training of Support Vector Machines Using Sequential Minimal Optimization," Advances in Kernel Methods: Support Vector Learning, MIT Press, Cambridge, MA, 1999.
Platt, "Probabilistic Outputs for Support Vector Machines & Comparisons to Regularized Likelihood Methods," Adv. in Large Margin Classifiers, MIT Press, Cambridge, MA, 1999.
Sahami et al. "A Bayesian Approach to Filtering Junk E-Mail," Amer. Assoc. for Art. Intell. Technical Report WS-98-05, 1998.
Cohen, "Learning Rules that Classify E-Mail," AT&T Laboratories, 1996.
Lewis, "Evaluating and Optimizing Autonomous Text Classification Systems," ACM SIGIR, 1995.
Lewis et al., "Training Algorithms for Linear Text Classifiers," ACM SIGIR, 1996.
APTE et al., "Automated Learning of Decision Rules for Text Categorization," ACM Transactions on Information Systems, vol. 12, No. 3, 1994.
Losee, Jr., "Minimizing Information Overload: The Ranking of Electronic Messages," Journal of Information Science 15, 1989.
Joachimes, "Text Categorization with Support Vector Machines: Learning with Many Relevant Features," Universitat Dortmund, Germany, 1998.
Morelli et al., "Predicting Technical Communication in Product Development Organizations," IEEE Transactions on Engineering Management, vol. 42, Iss. 3, Aug. 1995.
Webster's Third New International Dictionary, G. & C. Merriam Company, 1961, pp. 538, 834, 1460.
Computer Dictionary, Microsoft Press, 1997, Third Edition, p. 192.
Parmentier et al., "Logical Structure Recognition of Scientific Bibliographic References," 4th Int'l Conf. on Document Anlysis & Recognition, vol. 2, Aug. 18-20, 1997.
Kalogeraki et al., "Using Multiple Feedback Loops for Object Profiling, . . . " IEEE Int'l Symposium on Object-Oriented Real-Time Distributed Computing, May 2-5, 1999.
Johnson et al., "Adaptive Model-Based Neural Network Control," IEEE Int'l Conference on Robotics and Automation, May 13-18, 1990.
McKinnon et al., "Data Communications and Management of a Distributed Network of Automated Data Acquisition and Analysis Systems," 1997 IEEE Nuclear Science Symp., Nov. 1997.
Hagiwara, "Commercial Applications on the AP3000 Parallel Computer," 1998, IEEE, 0-818608427-5, pp. 198-205.
Moore et al., "Web Page Categorization and Feature Selection Using Association Rule and Principal Component Clustering," Proceedings of the 7th Workshop on Information Technologies and Systems, Dec. 1997.
Mase, "Experiments on Automatic Web Page Categorization for IR Systems," Technical Report, Stanford University, 1998.
Berners-Lee et al., "TheSemantic Web," Scientific American.com, May 17, 2001.
Brasethvik et al., "A Conceptual Modeling Approach to Semantic Document Retrieval," Proceedings of the 14th International Conference on Advanced Information Systems Engineering, May 27-31, 2002.

Lohman, "Grammar-like Functional Rules for Representing Query Optimization Alternative," 1998 ACM, pp. 18-27.

Khan et al., "Personal Adaptive Web Agent: A Tool for Information Filtering," Canadian Conference on Electrical and Computer Engineering, vol. 1, May 25, 1997, pp. 305-308.

Davies et al., "Knowledge Discovery and Delivery," British Telecommunications Engineering, London, GB, vol. 17, No. 1, April 1, 1998, pp. 25-35.

Persin, "Document Filtering for Fast Ranking," Sigir 94. Dublin, Jul. 3-6, 1994, Proceedings of the Annual International ACM-Sigir Conference on Research and Development in Information Retrieval, Berlin, Springer, DE, vol. CONF. 17, Jul. 3, 1994, pp. 339-348.

Han et al., "WebACE: A Web Agent for Document Categorization and Exploration," Proceedings of the $2^{nd}$ International Conference on Autonomous Agents Minneapolis/St. Paul, MN, May 9-13, 1998, Proceedings of the International Conference on Autonomous Agents, New York, NY, May 9, 1998, pp. 408-415.

Shimazu et al., "CAPIT: Natural Language Interface Design Tool with Keyword Analyzer and Case-Based Parser," NEC Research and Development, Nippon Electric Ltd., Tokyo, JP, vol. 33, No. 4, Oct. 1, 1992, pp. 679-688.

ITSC Information Technology Support Center, White Paper, "The Evoluation of the Call Center to 'Customer Contact Center,'" Feb. 2001.

"Transforming Your Call Center Into a Contact Center: Where Are You? Trends and Recommendations," An IDC Executive Brief (#33). Adapted from: Worldwide CRM Applications Market Forecast and Analysis Summary, 2001-2005, IDC #24750, Jun. 2001.

Margolis, Webster's Computer & Internet Dictionary, $3^{rd}$ Edition, 1999.

* cited by examiner

| Category | % Stolen by category: comp.graphics | | % Stolen from category: comp.graphics | |
|---|---|---|---|---|
| comp.windows.x | 22.8 % | (12) | 20.4 % | (10) |
| comp.sys.mac.hardware | 19.3 % | (12) | 8.1 % | (4) |
| rec.autos | 17.0 % | (7) | 6.1 % | (3) |
| sci.space | 13.9 % | (6) | 4.0 % | (2) |
| sci.med | 10.7 % | (6) | 6.1 % | (3) |
| sci.electronics | 10. % | (5) | 14.2 % | (7) |
| comp.os.ms-windows.misc | 7.1 % | (3) | 30.6 % | (15) |
| comp.sys.ibm.pc.hardware | 4.1 % | (2) | 8.1 % | (4) |
| talk.religion.misc | 4.0 % | (2) | 4.0 % | (2) |
| rec.sport.baseball | 3.5 % | (2) | 8.1 % | (4) |
| alt.atheism | 2.2 % | (1) | 4.0 % | (2) |
| sci.crypt | 2.1 % | (1) | 8.1 % | (4) |
| talk.politics.guns | 1.9 % | (1) | 4.0 % | (2) |
| talk.politics.mideast | 1.7 % | (1) | 8.1 % | (4) |
| rec.sport.hockey | 0 % | (0) | 4.0 % | (2) |
| rec.motorcycles | 0 % | (0) | 22.4 % | (11) |
| misc.forsale | 0 % | (0) | 20.4 % | (10) |
| soc.religion.christian | 0 % | (0) | 4.0 % | (2) |
| talk.politics.misc | 0 % | (0) | 4.0 % | (2) |

Number items in category: 49

SOFTWARE TOOL FOR TRAINING AND TESTING A KNOWLEDGE BASE

CROSS-REFERENCE TO RELATED APPLICATION

This application is a continuation of U.S. Utility application Ser. No. 10/835,694 filed on Apr. 29, 2004 entitled "SOFTWARE TOOL FOR TRAINING AND TESTING A KNOWLEDGE BASE," which application claims the benefit of U.S. Provisional Application No. 60/468,493, filed May 6, 2003. The disclosure of the foregoing applications are incorporated herein by reference.

BACKGROUND OF THE INVENTION

1. Field of the Invention

The present invention relates generally to computer software, and more particularly to relationship management software for classifying and responding to customer communications.

2. Description of the Prior Art

Most commercial enterprises devote significant time and resources to the tasks of reviewing and appropriately responding to inquiries, requests and other text-based electronic communications received from current or prospective customers. In order to enable more efficient administration of these tasks, certain software vendors, such as iPhrase Technologies, Inc. of Cambridge, Mass., have developed computerized customer relationship management (CRM) systems which perform analysis of incoming electronic communications and classify the communications into predetermined categories based on the determined intent. This categorization process may be utilized to automate generation of responses, or to guide human agents in the selection of a suitable response.

Such CRM systems typically require construction of a knowledge base (KB) before the analysis and classification functions may be performed reliably, i.e., before the CRM system may be put on-line. The KB contains relevant statistical and semantic information derived from a body of sample texts (known collectively as a corpus) by using a process known as training. KB performance may be improved by periodically retraining the KB with additional texts, or by providing the KB with online feedback (a process referred to as online learning, an example of which is described in U.S. patent application Ser. No. 09/754,179, filed Jan. 3, 2001). Generally, the accuracy and reliability of a CRM system depend on optimizing and maintaining KB performance. Poor KB performance may result in unacceptably high rates of false positives (i.e., frequently assigning non-relevant categories to communications) and/or false negatives (i.e., frequently failing to assign a relevant category to communications).

To construct and train a KB that provides satisfactory performance, the CRM user must carefully perform a number of preparatory tasks, including collecting appropriate sample texts, identifying a set of categories that classify the texts according to intent, and assigning the proper category to each sample text. If this process is conducted improperly or if erroneous information is used, then the performance of the resultant KB will be compromised, and the associated CRM system will behave in an unreliable fashion. Unfortunately, the prior art lacks tools for testing the performance of a KB and for reporting the test results in a manner which would allow the user to identify and remedy errors and problematic conditions in order to improve KB performance.

SUMMARY

Roughly described, an embodiment of the present invention provides a software tool for training and testing a knowledge base of a computerized customer relationship management system. The software tool may be conceptually divided into four component processes: corpus editing processes, knowledge base (KB) building processes, KB testing processes, and reporting processes. The corpus editing processes import selected sample texts, allow assignment of relevant categories from a predefined category list to individual corpus items, display corpus items and associated field and category information for user inspection, and modify the corpus items and associated information in accordance with user input. KB building processes select a subset of the corpus items to be used for training in response to user input, and cause a KB to be constructed based on analysis of the texts in the training subset. KB building processes may use the services of a modeling engine to perform the requisite text processing and semantic and statistical analysis operations. Once the KB has been built, KB testing processes test the performance of the KB by using it to classify each corpus item of in a second subset. Reporting processes then generate selected reports representative of the performance of the KB, and cause the reports to be displayed to the user. The reports may identify errors or problematic conditions to the user, which may be remedied by making appropriate changes to corpus items and/or organization of the KB.

Reports which may be generated by the reporting processes and viewed by the user include reports representative of overall KB performance across all categories, and reports representative of KB performance for a selected category. Illustrative examples of reports which may be selected include scoring graph reports, showing match scores in a selected category for each corpus item in the testing subset; reports showing the relationship between precision and recall, either for all categories or for a selected category; cumulative success over time reports, showing how the KB performance changes over time; threshold calculator reports, depicting the relationship between values of threshold, cost ratio, precision and recall and allowing the user to rationally set threshold values to be used by an application; and, stealing/stolen reports, showing the percentage and number of corpus items "stolen" by or from one category of a pair of categories, which may be used to identify categories having overlapping intents.

BRIEF DESCRIPTION OF THE FIGURES

In the attached drawings:

FIG. 11 is an exemplary stealing/stolen report.

DETAILED DESCRIPTION

Figure 1:
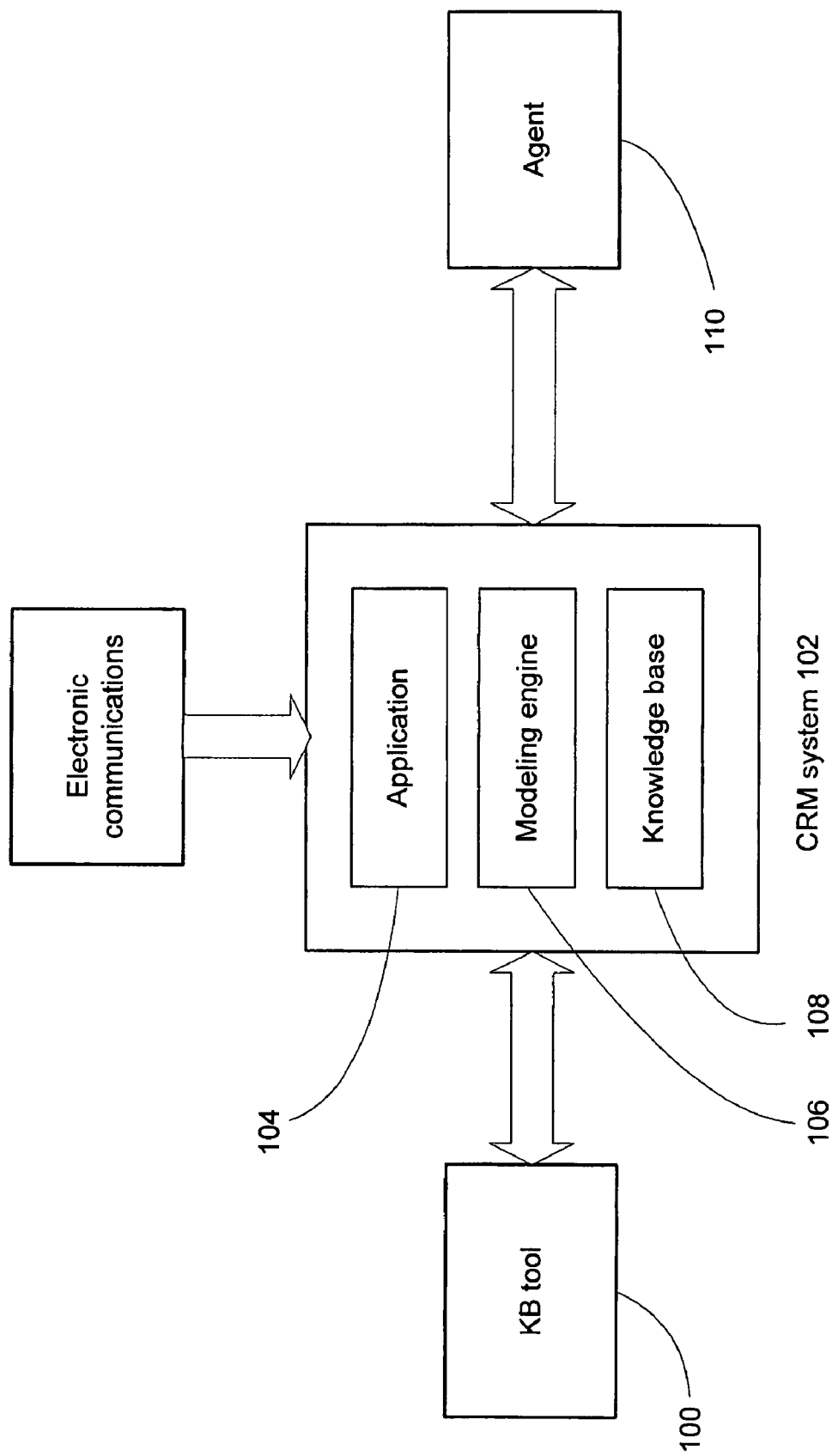
FIG. 1 is a block diagram depicting the knowledge base (KB) tool of the invention in relation to an exemplary computerized customer relationship management (CRM) system.

The invention may be more easily understood with reference to the attached figures, which depict various aspects of an embodiment of a software tool for training and testing a knowledge base of a computerized customer relationship management system. Referring initially to FIG. 1, there is shown a software tool (hereinafter referred to as the "KB tool") 100, which provides a user with the ability to train and test a knowledge base (hereinafter referred to as "KB") of a computerized customer relationship management ("CRM") system 102. CRM system 102 may be logically and conceptually divided into three components: an application 104, a modeling engine 106, and a KB 108. Application 104, which may be configured to perform any variety of functions, receives text-based electronic communications from an external source. The communications will typically take the form of electronic mail messages (e-mails), or text supplied through a web interface (e.g., in a query box of an HTML form). Application 104 calls upon the services of modeling engine 106 to analyze the communication and to determine an associated intent. As will be discussed in further detail below, modeling engine 106 may determine intent by calculating a set of match scores for each communication, wherein individual match scores of the match score set correspond to one of a plurality of pre-established categories. The match score is representative of a confidence that the communication "belongs to" the associated category; a high match score for a category is indicative of a high probability that the communication is relevant to that category, whereas a low match score indicates a low probability of relevance. Modeling engine 106 uses KB 108 to perform the analysis and scoring functions, as will be described below.

Match scores calculated by modeling engine 106 are returned to application 104, which may select and take an appropriate action based on the match scores. In one example, application 104 takes the form of an automated e-mail response application, which receives inquiries and requests from current or prospective customers. Depending on match score values determined by the modeling engine, application 106 may select and send an appropriate response to the inquiry or route the inquiry to an appropriate agent 110 for further action. As an illustrative example, modeling engine 106 may analyze an e-mail received from a prospective customer and calculate a high match score for a category associated with a specific product or service offered by a company. The e-mail response application could then automatically send the prospective customer a response with information about the specific product/service, or route the customer e-mail to a human agent having the relevant expertise.

Those skilled in the art will recognize that application 104, modeling engine 106 and KB 108, as well as KB tool 100, may reside and be executed on a single computer, or on two or more computers connected over a network. The computer or computers on which the components reside will typically be equipped with a monitor and/or other display device, as well as a mouse, keyboard and/or other input device such that the user may view UI screens and reports and enter user input. Those skilled in the art will also recognize that the foregoing software components will typically be implemented as sets of instructions executable by a general-purpose microprocessor.

In a specific implementation of CRM system 102, modeling engine 106 uses a two-phase process to analyze and classify received communications. In the first phase, a natural-language processing (NLP) engine extracts concepts from the communication and generates a structured document containing these concepts. As used herein, the term "concept" denotes any feature which may be used to characterize a specific category and distinguish it from other categories, including words or phrases as well as information representative of the source or context of the communication (e.g., an e-mail address). The NLP engine extracts the concepts by performing a prescribed sequence of operations, which may include language identification and encoding conversions, tokenization, text cleanup, spelling and grammatical error correction, and morphological and linguistic analysis.

According to the two-phase implementation of modeling engine 106, the structured document generated by the NLP engine and containing the extracted concepts is passed to a semantic modeling engine, which performs statistical pattern matching on the document by comparing it with the content of categories residing in KB 108 to produce the match score set. As noted above, each score in the match score set represents a confidence level that the communication falls within the associated category. KB 108 may also include one or more user-supplied rules specifying how to route communications to specific categories based on the content of the communication or related metadata (indicating, for example, the identity of the person sending the communication, or properties of the channel over which the communication was received, e.g., secured or unsecured).

Software utilizing a two-phase modeling engine of the foregoing general description is commercially available from iPhrase Technologies, Inc. It is noted, however, that the description of a specific implementation of modeling engine 106 is provided by way of an example, and the invention should not be construed as being limited thereto.

KB 108 may be regarded as an object containing the learned information required by modeling engine 106 to perform the match score generation function, and may take any suitable form, including a database or file (or collection of files). KB 108 contains relevant statistical and semantic information derived from a collection of sample texts known as a corpus. The process of deriving the relevant statistical and semantic information from the corpus is known as "training." The performance of KB 108 may be maintained and improved over time by providing it (either in real-time or at specified intervals) with feedback and adjusting information contained within KB 108 accordingly, a process known as "learning." In one example of feedback, application 104 may execute an "auto-suggest" function, wherein it identifies to a human agent two or more categories (or a set of candidate responses each of which is associated with one of the categories) most likely to be relevant to the received communication. When the agent selects one (or none) of the identified categories or associated responses, feedback is provided to KB 108, and statistics contained within KB 108 are appropriately modified to reflect the selection. The process of adapting a knowledge base using feedback is described in greater detail in co-pending U.S. patent application Ser. No. 09/754,179, filed Jan. 3, 2001, which is incorporated by reference.

In an exemplary implementation, KB 108 may be organized into an array of nodes, wherein each node contains semantic statistical information and/or rules for use by modeling engine 106 in classifying communications. Some or all of the nodes will represent individual categories. The simplest way to organize nodes in KB 108 is to place them in a single-level flat knowledge base structure. If, for example, CRM system 102 is designed to analyze customer e-mails and determine to which product each e-mail pertains, KB 108 may take the form of a flat knowledge base of several nodes, each node representing a product and containing the relevant semantic and statistical information. Alternatively, the nodes may be organized into a multi-level hierarchical structure, wherein certain of the nodes have child nodes, or into other structures known in the art.

Figure 2:
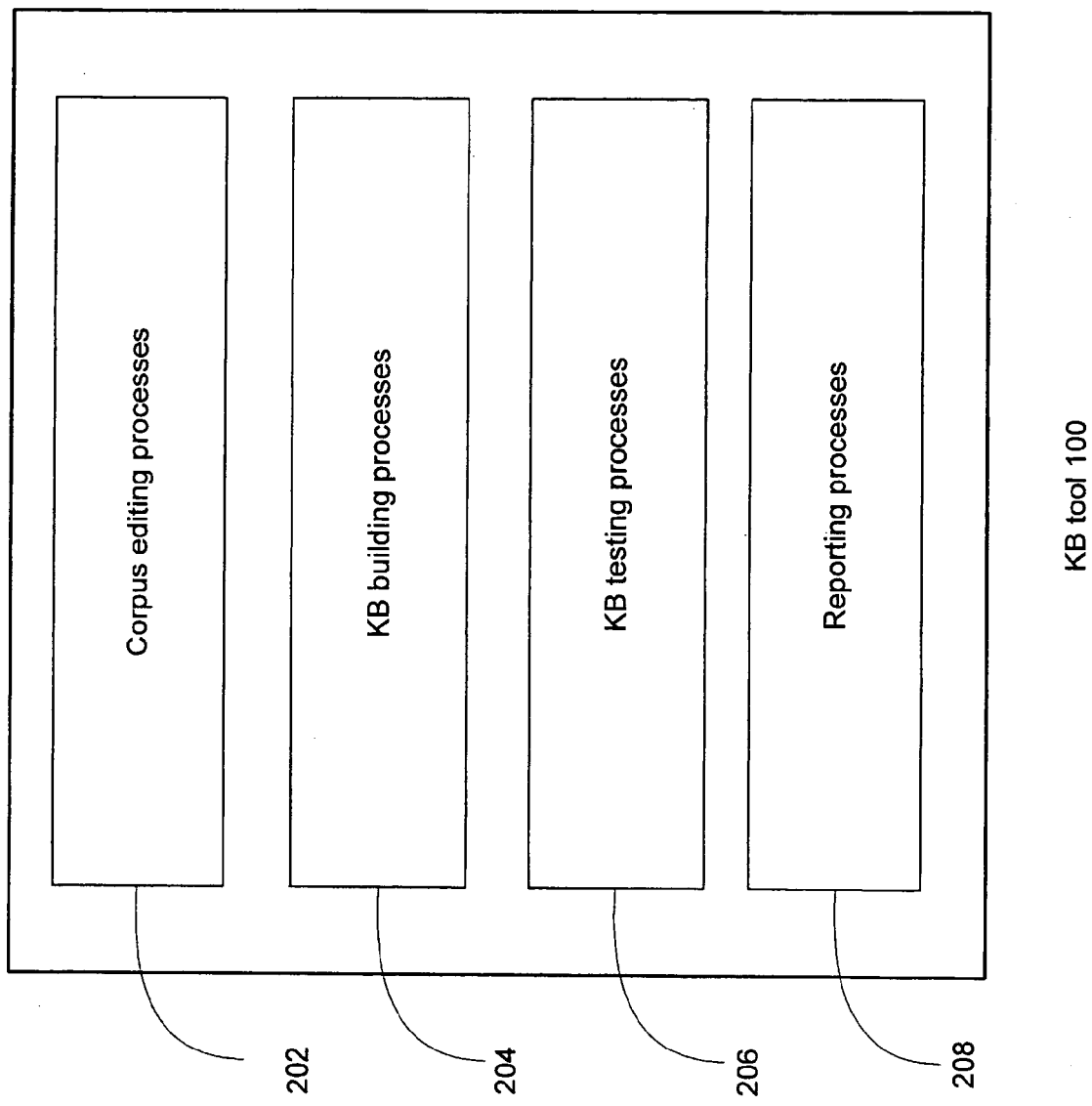
FIG. 2 is a block diagram depicting components of the KB tool.

KB tool 100 advantageously provides means for constructing and training KB 108, for assessing its performance, and for identifying various errors and problematic conditions. Referring now to FIG. 2, it is seen that KB tool 100 may be conceptually divided into four composite sets of processes: corpus editing processes 202, KB building processes 204, KB testing processes 206, and reporting processes 208. Generally described, corpus editing processes 202 import selected sample texts into a corpus, display corpus items and associated field and category information for user inspection, and modify the corpus items and associated information in accordance with user input; KB building processes 204 select a subset of the corpus items to be used for training in response to user input, and cause a KB to be constructed based on analysis and classification of text and metadata contained in the selected corpus items; KB testing processes 206 test the KB using a second subset of the corpus items; and, reporting processes 208 generate reports on the testing and cause the reports to be displayed to the user. It should be recognized that the partition of KB tool 100 into separate processes is conceptual in nature and should not be construed as specifying the actual program architecture of KB tool 100, i.e., as requiring that each set of processes reside in an independent module.

Figures 3, 4:
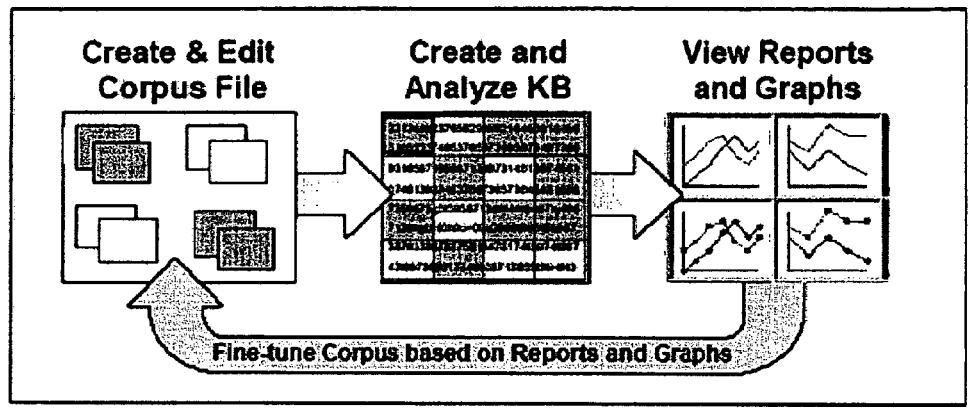
FIG. 3 is a workflow diagram depicting the steps of a process for training and testing the KB.
FIG. 4 is an exemplary user interface (UI) screen of the KB tool used for displaying and editing corpus items.
Figure 5:
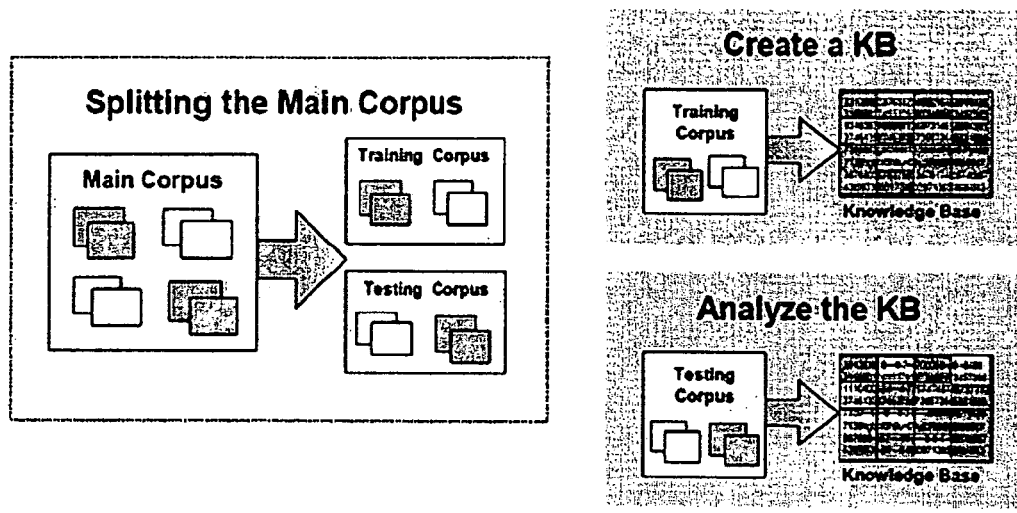
FIG. 5 is a block diagram depicting the division of the corpus items into training and testing subsets.

The functions performed by each of the processes, and by KB tool 100 as a whole, may be more clearly explained with reference to FIG. 3, which depicts the workflow associated with training and testing KB 108, and to FIGS. 4-11, which depict exemplary UI screens and reports that are displayed to the user and employed to implement the various functions of KB tool 100. Referring initially to FIG. 3 and proceeding from left to right, the operations of training and testing KB 108 begins with the creation and editing of the corpus file, which is managed by corpus editing processes 202. To create the corpus file, the user identifies (typically through a dialog box or other UI element) a source or sources of the sample texts that will be used for training and testing. The sample texts should be of the same type as and representative of the communications that will be analyzed and classified by CRM system 102. For example, if CRM system 102 is configured to act as an automated e-mail response application that automatically provides or suggests appropriate pre-prepared text responses to incoming e-mails, then the sample texts should be typical e-mail messages containing questions that are similar to those which will be received by CRM system 102. Performance of KB 108 will be improved by creating a corpus file containing a relatively large number of sample texts. Furthermore, it is beneficial to create a corpus file that contains a significant number of sample texts pertinent to each of the categories into which the communications will be classified. Files of various formats and types may serve as the source of the sample texts, including without limitation, comma separated value (CSV) files, Microsoft Excel (worksheet) files, and PST (Microsoft Outlook e-mail) files. In addition, the corpus file may be manually constructed (or modified) by entering or copying individual corpus items via a user interface.

Creation and editing of the corpus also involves defining corpus fields (also referred to as name-value pairs, or NVPs) and assigning a category to each corpus item. Corpus fields are data sets containing information associated with each corpus item. Definition of corpus fields allows the user to specify which elements of the corpus items (and of communications to be acted upon by CRM system 102) will be analyzed by modeling engine 106. For example, if the corpus items are e-mail messages, appropriate corpus fields may include a "From" field identifying the source of the corpus item, a "Message" field containing the message body, a "Subject" field containing the message subject, and a "Category" field identifying the category to which the corpus item belongs. Each corpus field may be assigned properties specifying the data type contained in the field (e.g., text or number) as well as options for how the field is processed (or not processed) by the NLP engine of modeling engine 108. These properties will typically be assigned via a dialog box or similar UI element. Each corpus item may include either or both unstructured and/or structured information. Structured information consists of information having certain predetermined constraints on its values and/or format, such as a corpus field which can only take a value of TRUE or FALSE. Unstructured information, such as a free language field (for example, the "Message" field described above) does not need to conform to prescribed restraints.

Corpus field names and properties may be specified by the user through a dialog box or other UI element. Alternatively, the corpus field names and properties may be specified in the sample text files themselves. In another alternative, corpus editing processes 202 may automatically define corpus fields and properties if the sample text file is in a certain prescribed format, such as a PST file containing e-mail messages.

Corpus editing processes 202 also manage the assignment of categories to each corpus item. The categories are representative of distinct groupings into which the communications may be classified according to the communications' intents. Typically, identification of categories is performed by manually reviewing a set of sample texts to determine what common intents are expressed in the texts. In one example, CRM system 102 is an automated e-mail response application for a product retailer. The user, upon review of a sample of recently received emails, finds that the e-mails may be classified into one of three areas: requests for product specifications and pricing information, complaints about purchased products, and inquiries regarding store locations and hours of operation. The user may then specify, using a dialog box or other UI element presented by the corpus editing processes 202 to the user, that three categories are to be used by KB 108 for classification, consisting of a product information request category, a complaint category, and a store location category. Next, the user assigns a relevant category to each item (e-mail) in the corpus. Assignment of the categories may be performed via a UI presented by corpus editing processes 202, or alternatively the categories may be added to the file containing the sample texts prior to importing them into the corpus file. Other methods and techniques, both manual and semi-automated, may be utilized to define a set of categories and assign a relevant category to individual corpus items. These methods and techniques include locating specified text strings, classifying by response (e.g., for sample texts consisting of standard ("canned") answers appended to customer email inquiries), and clustering (identifying semantic similarities in unclassified corpus items to group textually similar items together).

FIG. 4 is an example of a UI 400 presented by corpus editing processes 202, allowing a user to view and edit individual corpus items. Each row 402 in the UI represents an individual corpus item, and each column 404 represents a corpus field, or name-value pair. In the example depicted in FIG. 4, the corpus items are articles posted to Usenet groups, and the corpus fields include a "From" field identifying the source email address, a "Message" field containing the text of the article, and a "Subject" field. The corpus fields further include a "Categories" field identifying the category which has been assigned by the user to each corpus item (in the example depicted, the Usenet group to which the article has been posted), using a manual or semi-automated technique. The user may select one or more corpus items from the list displayed in the UI to view details of the items or to edit the values of the corresponding corpus fields.

Figure 6:
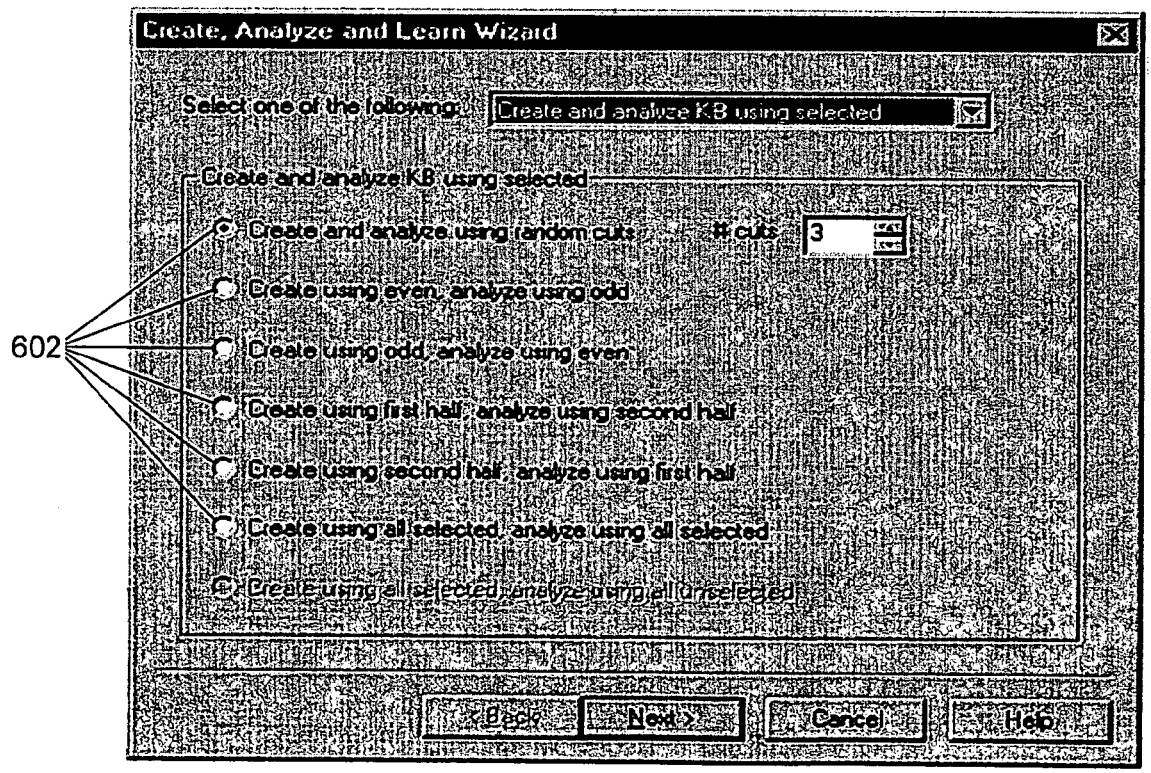
FIG. 6 is an exemplary UI screen of the KB tool presenting a set of user-selectable options for dividing the corpus into training and testing subsets.

Referring again to the workflow diagram of FIG. 3, after the corpus file has been created and edited, KB 108 is built and tested from analysis of the corpus items. Building of KB 108 is managed by KB building processes 204. KB building processes initially split the corpus into a first subset to be used for training KB 108, and a second subset to be used for testing KB 108. The process of splitting the corpus into training and testing subsets is symbolically depicted in FIG. 5. Of course, many schemes may be utilized for dividing the corpus into subsets. Preferably, the manner in which the corpus is split is selectable by the user. FIG. 6 is an exemplary UI screen 600 listing various user-selectable options 602 for splitting the corpus into subsets for training and testing (e.g., using random cuts, create (train) using even-numbered items/analyze (test) using odd-numbered items (a method known in the art as "jack-knife") and so on). It should be recognized that the training and testing subsets may be overlapping (i.e., include common corpus items), and that one or both of the subsets may include the entire corpus (e.g., as used for the "Create using all selected, analyze using all selected" option.)

After the corpus has been split into training and testing subsets, KB building processes 204 initiate the creation of KB 108. Generally described, the process of building KB 108 involves deriving relevant semantic and statistical information from the corpus items in the training subset and associating this information with corresponding nodes of the KB 108. As noted above, some or all of the nodes represent categories of the predefined set of categories; for the automated e-mail response application example described above, KB 108 may consist of three nodes arranged in a flat structure: a first node corresponding to the product information request category, a second node corresponding to the complaint category, and a third node corresponding to the store location category. According to the implementation depicted in FIG. 1, KB building processes 204 may invoke the services of modeling engine 106 to perform natural language and semantic analysis of the corpus texts and thereby derive the semantic and statistical information to be associated with the nodes of KB 108. Those skilled in the art will recognize that various well-known techniques and algorithms may be employed for processing of the corpus texts and extraction of the relevant semantic and statistical information, and so such techniques and algorithms need not be discussed herein. It should also be recognized that KB 108 will not necessarily be empty (i.e., lacking structure and relevant semantic/statistical information) prior to initiation of the KB building process; in some cases and implementations, KB building processes 204 will operate on an existing KB which has previously been provided with a structure and relevant information. In such cases and implementations, KB building processes 204 will cause the structure and information to be modified in accordance with the results of analysis of the texts in the training subset.

After KB 108 has been built, its performance is tested by classifying the corpus items in the testing subset of the corpus using the information contained in KB 108 to determine if the corpus items have been classified into the most relevant category(ies). Testing of KB 108 is managed by KB testing processes 206. In the FIG. 1 embodiment, KB testing processes 108 may call upon the services of modeling engine 106 to extract concepts from the corpus items (using, for example, an NLP engine) and perform statistical pattern matching using the relevant semantic and statistical information for each category contained within KB 108. This process will return a set of match scores for each corpus item in the testing subset. Each match score in the match score set represents a confidence level that the corpus item belongs to the associated category. In a typical implementation, match scores determined by modeling engine 106 fall within a pre-established range (e.g., 0-100), with higher scores denoting a high level of confidence that the corpus item belongs to the associated category, and lower scores denoting a low level of confidence that the corpus item belongs to the associated category. For example, using the three-category KB example discussed above (consisting of a product information category, a complaint category, and a store location category), a corpus item in the testing subset could have a match score of 95 for the product information category, a match score of 30 for the complaint category, and a match score of 5 for the store location category. If the corpus item in question is properly classified in the product information category, then KB 108 would be regarded as performing well; if, in fact, the corpus item is properly classified in one of the other two categories, then KB 108 would be regarded as performing poorly. Test results, comprising match score sets obtained for each corpus item in the training subset are stored by KB testing processes 206 and used for generating reports assessing various aspects of KB performance, as described below.

Referring again to the workflow diagram shown in FIG. 3, the user may select and view reports generated by KB tool 100 to gauge the performance of KB 108 and make appropriate adjustments to improve performance. Report generation is managed by reporting processes 208. As used herein, the term "report" denotes any collection of graphical and/or textual information that visually represents the performance of KB 108. Reports generated by reporting processes 208 include both summary reports, which depict the performance of KB 108 across all categories, and category reports, which depict the performance of KB 108 for a specified category. In a typical implementation, the reporting processes 208 will cause a UI or series of UI screens to be displayed in which the user can select the type and content of report he wishes to view. Examples of reports generated by KB tool 100 are described below. It is noted, however, that the reports described and depicted herein are intended as illustrative examples, and that the scope of the present invention should not be construed as being limited to these examples. It is further noted that the reports may be presented in a window of a graphical display and/or in a printed document.

Figure 7:
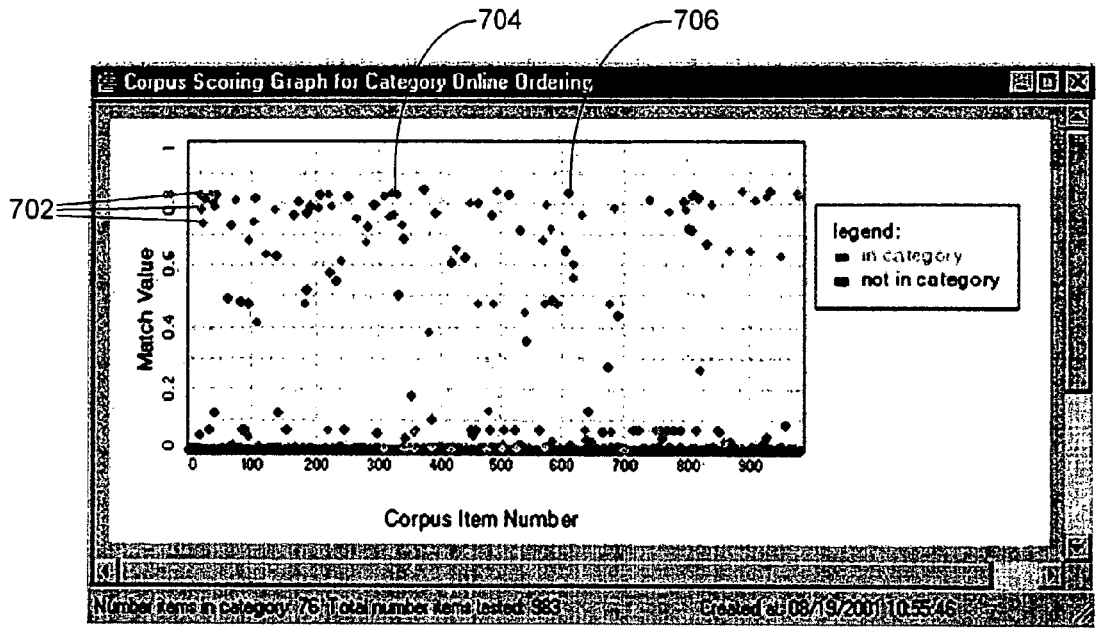
FIG. 7 is an exemplary scoring graph report.

FIG. 7 is an exemplary category report in the form of a scoring graph report 700. Scoring graph report 700 depicts match scores for each corpus item in a selected category. Each point 702 on the graph represents an individual corpus item. Light points 704 represent corpus items that belong to the selected category, and dark points 706 represent corpus items that do not belong to the selected category. If KB 108 is performing well in the selected category, most of the light points 704 will appear in the upper portion of the graph (at or above a match score of 0.80), and most of the dark points 706 will appear in the lower portion of the graph. In a preferred implementation of the scoring graph report, a user can select an individual point 702 on the graph (e.g., by clicking on the point) to view details of the corresponding corpus item. This feature allows the user to quickly and easily inspect "stray points" which are displaced from their expected, optimal area of the graph, i.e., light points 704 appearing in the lower portion of the graph and dark points 706 appearing in the upper portion of the graph, and determine if any discernible error or condition exists which caused the misclassification or failure to classify into the expected category. For example, the user may click on one of the stray dark points and discern that the associated corpus item was assigned the wrong category during the corpus creation process. The user may then edit the corpus item to assign the correct category and re-train KB 108 using the corrected information.

Figure 8:
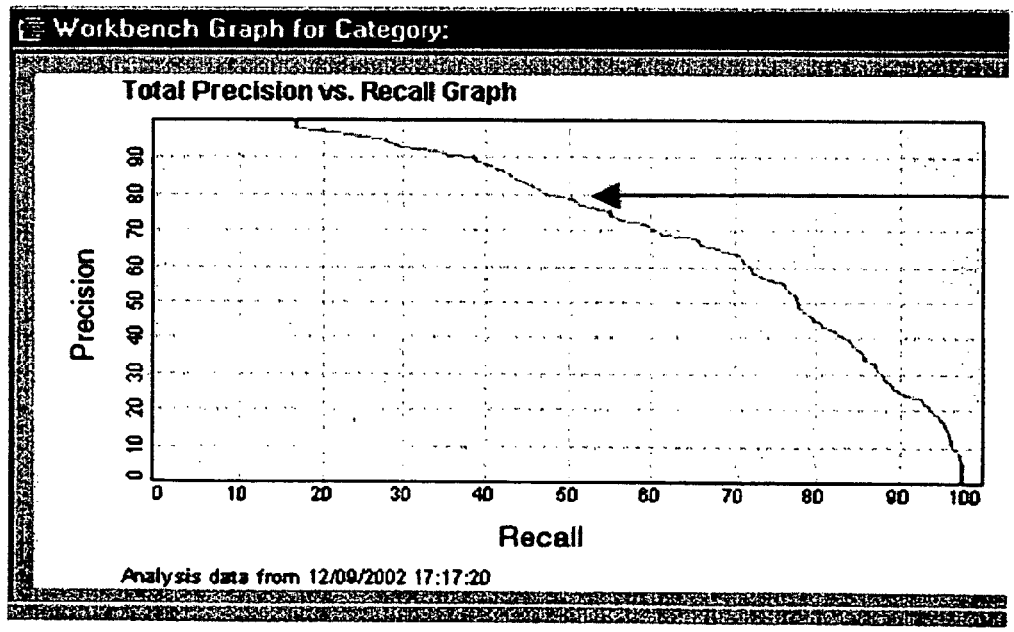
FIG. 8 is an exemplary report of total precision versus recall.

FIG. 8 is a summary report 800 consisting of a graph of total precision versus recall for all categories in KB 108. As used herein, the term "precision" denotes the fraction of corpus items identified as relevant to a category that are actually relevant to the category, and the term "recall" denotes the fraction of corpus items actually relevant to a category that are identified as being relevant. The graph of total precision versus recall represents a weighted average of the precision for each recall value, wherein categories having a relatively greater number of texts are accorded greater weight than categories having a relatively smaller number of texts. The total precision versus recall graph provides a visual indication of the overall performance of KB 108. Generally, a curve located primarily in the upper-right portion of the graph indicates that KB 108 is performing well, whereas a curve located primarily in the lower-left portion of the graph indicates a poorly performing KB 108. If the results indicate that the performance of KB 108 is poor, then the user may select and view category reports depicting precision verses recall results for each category in order to identify whether any specific category is particularly problematic.

Figure 9:
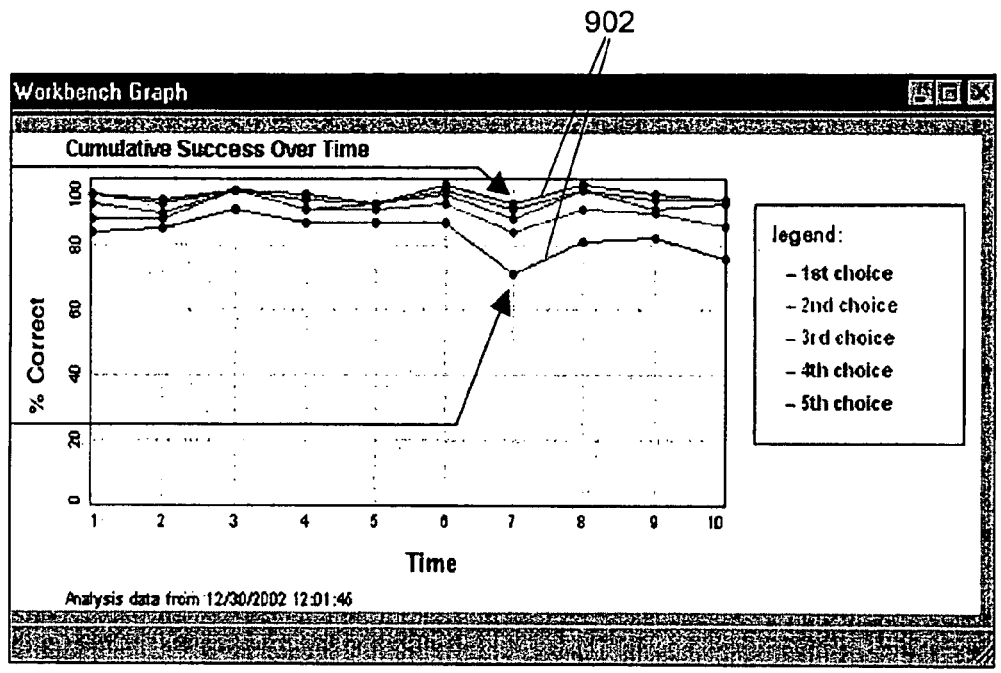
FIG. 9 is an exemplary cumulative success over time report.

FIG. 9 shows an exemplary cumulative success over time report 900. This report consists of a graph depicting the cumulative success of KB 108 during the lifetime of a chronological testing corpus (i.e., a corpus whose items are in the order they were received by the system). Each line 902 on the graph show how often the correct category was among each of the top five category choices (those categories having the highest match scores). More specifically, the bottommost line represents, for each point in time, how often the correct category was the highest scoring category, the next (vertically adjacent) line shows how often the correct category was one of the two highest scoring categories, and so on. Cumulative success over time report 900 is useful to assess trends in KB 108 performance, and identify problems occurring during particular time frames (as evidenced by dips in the lines indicative of decreased KB 108 performance). Generation of the cumulative success over time report requires inserting a corpus field for each corpus item that contains the date and time the corpus item was received.

Figure 10:
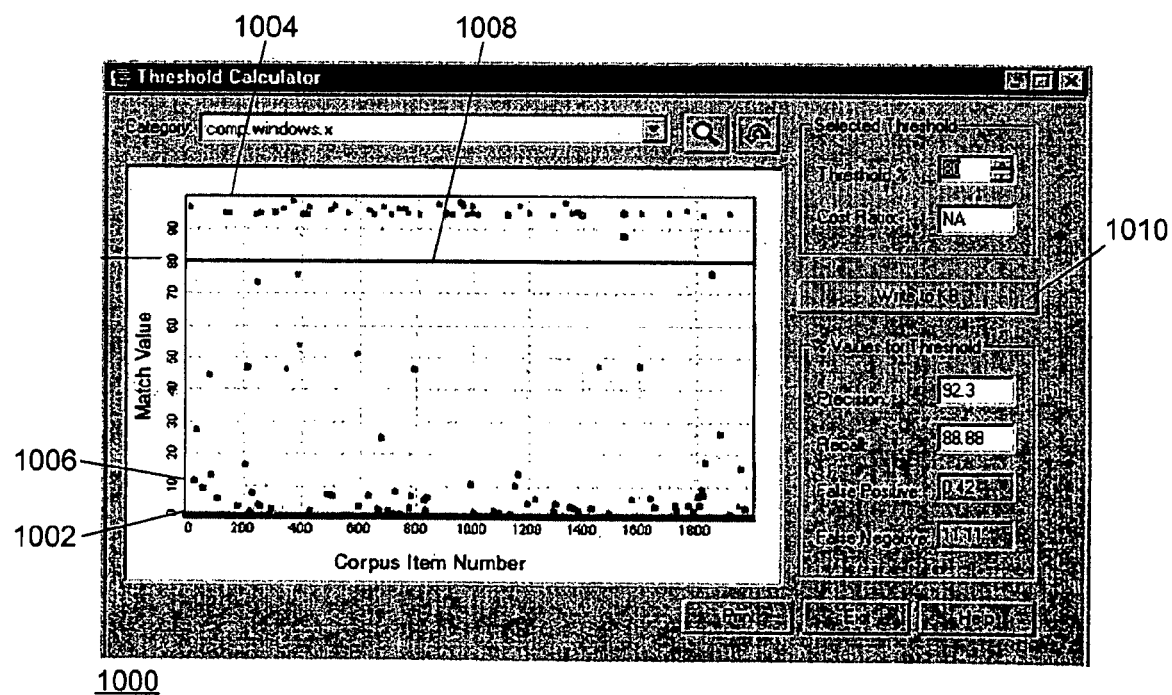
FIG. 10 is an exemplary threshold calculator report.

FIG. 10 shows an exemplary threshold calculator report 1000. Thresholds are values used by application 104 to determine whether to take a specified action with respect to a communication. For example, where application 104 is in the form of an automated e-mail response application, a threshold setting may be used by application 104 to determine whether to auto-respond to an incoming e-mail, i.e., application 104 will auto-respond to a customer email only if the match score for a category exceeds a value (e.g., 90) indicative of a high confidence that the email should be classified in the category. Prior art CRM systems have generally lacked tools enabling the user to intelligently set thresholds in order to achieve a desired performance objective. Threshold calculator report 1000 provides a means for depicting the relationship between the threshold value and various performance parameters, including cost ratio (defined below), precision, and recall.

Threshold calculator report 1000 includes a graph 1002 showing match values for each corpus item for a specified category. Again, light points 1004 represent corpus items which belong to the specified category, and dark points 1006 represent corpus items which do not belong to the specified category. The current value of the threshold is represented as line 1008. Threshold calculator report 1000 also lists values of cost ratio, precision, recall, false positives, and false negatives corresponding to the current threshold value. The user may set values for any one of the following parameters: threshold, cost ratio, precision, or recall. In alternative implementations, user-settable values may include other suitable parameters which would be apparent to those skilled in the art. One such user-settable value is an automation ratio, which denotes the percentage of corpus items which meet or exceed the threshold. Responsive to entry of any of these values, reporting processes 208 calculates and displays corresponding values of the other parameters. For example, if the user enters a threshold value, reporting processes 208 calculate and display the resultant values of precision and recall. In another example, the user enters a desired value of precision, and reporting processes 208 calculate and display the corresponding threshold value. The user may also specify a cost ratio, which is the amount saved by automatically responding to a communication correctly divided by the amount lost by automatically responding to a communication incorrectly (for example, a saving of $10 for each correct automated response and a loss of $100 for each incorrect automated response will yield a cost ratio of 0.1), and reporting processes 208 will responsively calculate and display the corresponding threshold value. The methods of calculating the values of the foregoing parameters based on other specified parameters should be easily discernible to one of ordinary skill in the art and need not be described herein. The threshold calculator report 1000 may also include a button 1010 allowing the user to write the current (most recently specified or calculated) threshold value to the corresponding node of KB 108.

Finally, FIG. 11 shows a "stealing/stolen" report 1100 generated for a specified category. In some cases, poor KB performance occurs when categories "steal" corpus items from each other (i.e., when a corpus item receives a higher match score for an inappropriate category, relative to the match score calculated for the category to which the item belongs). For a selected category, stealing/stolen report 1100 shows the percentage and number of corpus items initially assigned to the selected category which yielded higher match scores in other categories (the "stolen from" column). In addition, stealing/stolen report 1100 displays for, each of the other categories, the percentage of corpus items initially assigned to the category which yielded a higher match score in the selected category (the "stolen by" column).

The occurrence of a relatively high number of incidents of stealing between pairs of categories may indicate that modeling engine 106 does not perceive a clear difference between the intents of the two categories, i.e., that the two nodes of KB 108 representing the categories contain overlapping content. In such situations, KB 108 performance may be improved by carefully redefining the categories to more clearly distinguish intents (or, if appropriate, joining them into a single category), reassigning categories to the corpus items to reflect the redefined categories, and retraining KB 108 using KB building processes 204.

Referring again to the FIG. 3 workflow diagram, the user may utilize information contained in one or more of the reports generated by reporting processes 208 to improve KB performance. Actions which may be taken by the user to remedy problems identified in the reports include redefining, deleting or adding categories; correcting or otherwise modifying individual corpus items; and, modifying KB 108 structure (e.g., by changing the organization of nodes, or by adding or changing rule-based nodes). Once these actions have been taken, KB 108 may be retrained by invoking KB building processes 204, and the retrained KB 108 may be tested against the testing subset of corpus items using KB testing processes 206. The user may then evaluate the performance of the retrained KB 108 by generating the appropriate reports using reporting processes 208.

It will be recognized by those skilled in the art that, while the invention has been described above in terms of preferred embodiments, it is not limited thereto. Various features and aspects of the above invention may be used individually or jointly. Further, although the invention has been described in the context of its implementation in a particular environment and for particular applications, those skilled in the art will recognize that its usefulness is not limited thereto and that the present invention can be beneficially utilized in any number of environments and implementations.

What is claimed is:

1. A computer-implemented method for training and testing a knowledge base of a computerized customer relationship management system, comprising:
    collecting, in a computer, one or more corpus items into a corpus, wherein the corpus items comprise electronic communications from customers;
    assigning, in the computer, a category from a set of predefined categories to each of the corpus items in the corpus;
    building, in the computer, a knowledge base of the computerized customer relationship management system by performing natural language and semantic analysis of a first subset of the corpus items in the corpus;
    testing, in the computer, the knowledge base of the computerized customer relationship management system on a second subset of the corpus items in the corpus by classifying each of the corpus items of the second subset into at least one of the predefined categories using information contained in the knowledge base of the computerized customer relationship management system; and
    generating and displaying, in the computer, a report based on results produced by the testing step to a user of the computerized customer relationship management system to gauge performance of the computerized customer relationship management system using the knowledge base, so that appropriate adjustments are made to improve the performance of the computerized customer relationship management system using the knowledge base.

2. The method of claim 1, wherein the step of testing the knowledge base includes calculating a set of scores for each corpus item in the second subset, each score from the calculated set of scores being associated with a corresponding category and being representative of a confidence that the corpus item belongs to the corresponding category.

3. The method of claim 1, wherein the step of generating and displaying a report includes generating a report relating to a single selected category.

4. The method of claim 1, wherein the step of generating and displaying a report includes generating a cumulative report relating to a plurality of categories.

5. The method of claim 1, wherein the step of generating and displaying a report includes:
    receiving user input specifying one of a precision value, a recall value, false positive rate, false negative rate, automation ratio or a cost ratio; and
    calculating and displaying, for a selected category, a match score based on the user input.

6. The method of claim 1, wherein the step of generating and displaying a report includes:
    receiving user input specifying a match score; and
    calculating and displaying, for a selected category, a precision value and a recall value based on the user input.

7. The method of claim 1, wherein the step of generating and displaying a report includes calculating precision as a function of recall and causing a graph to be displayed depicting the relationship between precision and recall.

8. The method of claim 1, wherein the step of generating and displaying a report includes generating and displaying a graph depicting cumulative success over time, the graph showing, for a plurality of groups of corpus items each having a common time parameter, the fraction of corpus items in the group that were appropriately classified.

9. The method of claim 1, wherein the step of generating and displaying a report includes generating and displaying a report showing, for each of a plurality of pairs of categories, a percentage of corpus items initially assigned to a first category of the pair of categories that were erroneously classified into a second category of the pair of categories.

10. The method of claim 1, wherein the step of generating and displaying a report includes generating and displaying a scoring report showing, for a selected category, match scores for each corpus item in the second subset, the match scores being representative of the relevance of the selected category to the corpus item.

11. The method of claim 1, wherein the first and second subsets of corpus items are selected in accordance with user input.

12. The method of claim 1, wherein the steps of use building and testing the knowledge base include using a modeling engine to analyze and classify corpus items.

13. The method of claim 1, wherein the step of generating and displaying a report includes selecting a report from a plurality of available reports in response to user input.

14. The method of claim 1, wherein the corpus items comprise customer communications received from one or more external sources.

15. The method of claim 1, wherein the corpus items include structured and unstructured information.

16. A device embodying instructions that, when executed by a computer, result in the computer performing a computer-implemented method for training and testing a knowledge base of a computerized customer relationship management system, comprising:
    collecting, in a computer, one or more corpus items into a corpus, wherein the corpus items comprise electronic communications from one or more customers;
    assigning, in the computer, a category from a set of predefined categories to each of the corpus items in the corpus;
    building, in the computer, a knowledge base of the computerized customer relationship management system by performing natural language and semantic analysis of a first subset of the corpus items in the corpus;
    testing, in the computer, the knowledge base of the computerized customer relationship management system on a second subset of the corpus items in the corpus by classifying each of the corpus items of the second subset into at least one of the predefined categories using information contained in the knowledge base of the computerized customer relationship management system; and generating and displaying, in the computer, a report based on results produced by the testing step to a user of the computerized customer relationship management system to gauge performance of the computerized customer relationship management system using the knowledge base, so that appropriate adjustments are made to improve the performance of the computerized customer relationship management system using the knowledge base.

* * * * *